United States Patent
Liu

(10) Patent No.: US 9,753,298 B2
(45) Date of Patent: Sep. 5, 2017

(54) REDUCING SPECKLE IN PROJECTED IMAGES

(71) Applicant: OMNIVISION TECHNOLOGIES, INC., Santa Clara, CA (US)

(72) Inventor: Yi-Wei Liu, New Taipei (TW)

(73) Assignee: OmniVision Technologies, Inc., Santa Clara, CA (US)

(*) Notice: Subject to any disclaimer, the term of this patent is extended or adjusted under 35 U.S.C. 154(b) by 0 days.

(21) Appl. No.: 14/247,521

(22) Filed: Apr. 8, 2014

(65) Prior Publication Data

US 2015/0286064 A1    Oct. 8, 2015

(51) Int. Cl.
G03B 21/20    (2006.01)
G02B 27/48    (2006.01)
G02B 3/00     (2006.01)

(52) U.S. Cl.
CPC .......... *G02B 27/48* (2013.01); *G03B 21/208* (2013.01); *G03B 21/2033* (2013.01); *G02B 3/0006* (2013.01)

(58) Field of Classification Search
CPC ............ G02B 27/0927; G02B 27/0933; G02B 27/0916; G02B 27/48; H04N 5/7416; H04N 9/3132; H04N 9/3161; H04N 9/3197
See application file for complete search history.

(56) References Cited

U.S. PATENT DOCUMENTS

| | | |
|---|---|---|
| 5,029,975 A | 7/1991 | Pease |
| 6,246,526 B1 * | 6/2001 | Okuyama .......... 359/621 |
| 6,594,090 B2 | 7/2003 | Kruschwitz et al. |
| 6,791,739 B2 | 9/2004 | Ramanujan et al. |
| 7,271,962 B2 | 9/2007 | Kasazumi et al. |
| 7,369,298 B2 | 5/2008 | Lee et al. |
| 7,547,873 B2 | 6/2009 | Babayoff et al. |
| 7,646,518 B2 | 1/2010 | Kasazumi |
| 7,706,048 B2 | 4/2010 | Horikawa et al. |
| 7,715,084 B2 | 5/2010 | Tan et al. |
| 7,748,853 B2 | 7/2010 | Yamauchi |

(Continued)

FOREIGN PATENT DOCUMENTS

| | | |
|---|---|---|
| CN | 201780448 U | 3/2011 |
| CN | 102422221 A | 4/2012 |

(Continued)

OTHER PUBLICATIONS

TW Application No. 102123505—First Taiwanese Office Action and Search Report, with English Translation, mailed Aug. 8, 2014 (17 pages).

(Continued)

*Primary Examiner* — Sultan Chowdhury
*Assistant Examiner* — Danell L Owens
(74) *Attorney, Agent, or Firm* — Christensen O'Connor Johnson Kindness PLLC

(57) ABSTRACT

A despeckle optical system for an image projector includes a diffuser, an in-plane vibrator, a microlens array, and a vibrator driver. The in-plane vibrator is coupled to vibrate the diffuser along a vibration plane. The vibrator driver is coupled to drive the in-plane vibrator and configured to drive the in-plane vibrator at different vibration amplitudes for averaging the intensity of speckle in display light that propagates through the diffuser via the microlens array.

7 Claims, 3 Drawing Sheets

(56) References Cited

U.S. PATENT DOCUMENTS

| | | | |
|---|---|---|---|
| 7,866,831 B2 | 1/2011 | Kasazumi et al. | |
| 7,872,800 B2 | 1/2011 | Rickers et al. | |
| 7,969,644 B2 | 6/2011 | Tilleman et al. | |
| 8,109,638 B2 | 2/2012 | Chen et al. | |
| 8,172,141 B2 | 5/2012 | Knowles et al. | |
| 8,226,241 B2 | 7/2012 | Chen et al. | |
| 8,226,247 B2 | 7/2012 | Kitano et al. | |
| 8,317,333 B2 | 11/2012 | Kasazumi et al. | |
| 2001/0008457 A1 | 7/2001 | Zhang | |
| 2003/0030880 A1 | 2/2003 | Ramanujan et al. | |
| 2003/0039036 A1 | 2/2003 | Kruschwitz et al. | |
| 2006/0023284 A1 | 2/2006 | Lee et al. | |
| 2006/0227293 A1* | 10/2006 | Kasazumi | G02B 5/0221 353/30 |
| 2007/0035512 A1* | 2/2007 | Kim | H04N 13/0454 345/156 |
| 2007/0070303 A1 | 3/2007 | Yonekubo | |
| 2008/0079904 A1* | 4/2008 | Bartlett | G03B 21/005 353/31 |
| 2008/0106779 A1 | 5/2008 | Peterson et al. | |
| 2009/0103176 A1 | 4/2009 | Mizushima et al. | |
| 2009/0185251 A1 | 7/2009 | Chen et al. | |
| 2010/0290009 A1 | 11/2010 | Chen et al. | |
| 2010/0309439 A1 | 12/2010 | Bi et al. | |
| 2011/0002019 A1 | 1/2011 | Routley et al. | |
| 2011/0037953 A1* | 2/2011 | Nizani | G02B 3/005 353/38 |
| 2011/0234985 A1* | 9/2011 | Ryf | G03B 21/14 353/38 |
| 2011/0261274 A1 | 10/2011 | Shiue et al. | |
| 2012/0002174 A1 | 1/2012 | Shiue et al. | |
| 2013/0010365 A1 | 1/2013 | Curtis | |
| 2014/0055755 A1 | 2/2014 | Fan | |
| 2015/0124227 A1 | 5/2015 | Kobayashi | |

FOREIGN PATENT DOCUMENTS

| | | |
|---|---|---|
| JP | 2014-029430 A | 2/2014 |
| JP | 2014-059513 A | 4/2014 |
| TW | 200916824 A1 | 4/2009 |
| TW | 201015111 A1 | 4/2010 |
| TW | 201015197 A1 | 4/2010 |
| TW | 201124751 A | 7/2011 |
| TW | 201213858 A1 | 4/2012 |
| TW | 201237540 A | 9/2012 |

OTHER PUBLICATIONS

U.S. Appl. No. 13/593,316—Non-Final Office Action, mailed May 12, 2014, 19 pages.

Jutamulia, S. et al., "Reduction of coherent noise using various artificial incoherent sources," Optik, 70, No. 2 (1985) pp. 52-57.

Hsu, S. et al., "Two dimensional microscanners with large horizontal-vertical scanning frequency ratio for high resolution laser projectors," MOEMS and Miniaturized Systems VII, edited by David L. Dickensheets, Harald Schenk, Proc. of SPIE vol. 6887, 688703 (2008) 13 pages.

Chen, J. et al. "Comparison of Control of Coherence of Partially Incoherent Light Source and Fiber Optic Cross Sectional Microscopic Image," 2009 Annual Meeting of Physics Society of Republic of China (In Chinese), English translation of Abstract enclosed, 2 pages.

Nguyen, C. "MEMS Comb-Drive Actuators," EE 143, Microfabrication Technology, Spring 2010, 3 pages.

CN Application No. 201310291249.8—First Chinese Office Action and Search Report, with English Translation, mailed Feb. 25, 2015 (27 pages).

CN Application No. 201310291249.8—Second Chinese Office Action and Search Report, with English Translation, mailed Oct. 26, 2015 (25 pages).

U.S. Appl. No. 13/593,316—Notice of Allowance, mailed Oct. 10, 2014, 14 pages.

ROC (Taiwan) Application No. 103125892—First Office Action and Search Report, with English Translation, mailed Dec. 8, 2015, (10 pages).

CN 201410300995.3—First Chinese Office Action with English translation, issued May 23, 2016, 18 pages.

CN 201410300995.3—Second Chinese Office Action with English translation, issued Jan. 25, 2017, 11 pages.

\* cited by examiner

REDUCING SPECKLE IN PROJECTED IMAGES

TECHNICAL FIELD

This disclosure relates generally to optics, and in particular but not exclusively, relates to image projectors.

BACKGROUND INFORMATION

Many conventional image projectors include a display that modulates an illuminating light beam. The illuminating light beam may be a white light provided by a light source, such as metal halide lamps, xenon lamps, or mercury lamps. On the other hand, the illuminating light beam may include three separate color light beams, which are red, green, and blue light beams. Each color light beam may be separately provided by a light emitting diode ("LED"), a laser diode, or other types of laser such as gas laser, solid state laser, etc. The display panel may be a digital micro-minor device ("DMD") or micro-electro-mechanical system ("MEMS") such as in a digital light processing ("DLP") display system. The display panel may also be a liquid crystal display ("LCD") or liquid crystal on silicon ("LCOS") display.

Lasers have some advantages over other light sources. For example, their lifespan is about 10,000 hours in contrast to an approximately 1,500 hours of lifespan of mercury lamps. Lasers may also provide a wider color gamut as compared with traditional light sources. In addition, a laser light source is compact in size, which may be more suitable for a pico projector. A pico projector is a projector used in handheld devices such as mobile phones, personal digital assistants, digital cameras, etc, which have little space to accommodate an attached display screen. Thus, a displayed image is projected onto any nearby viewing surface such as a wall. Advances in image projectors that use laser light sources expand the application and use cases of image projectors.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a image projection system for reducing image speckle is described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
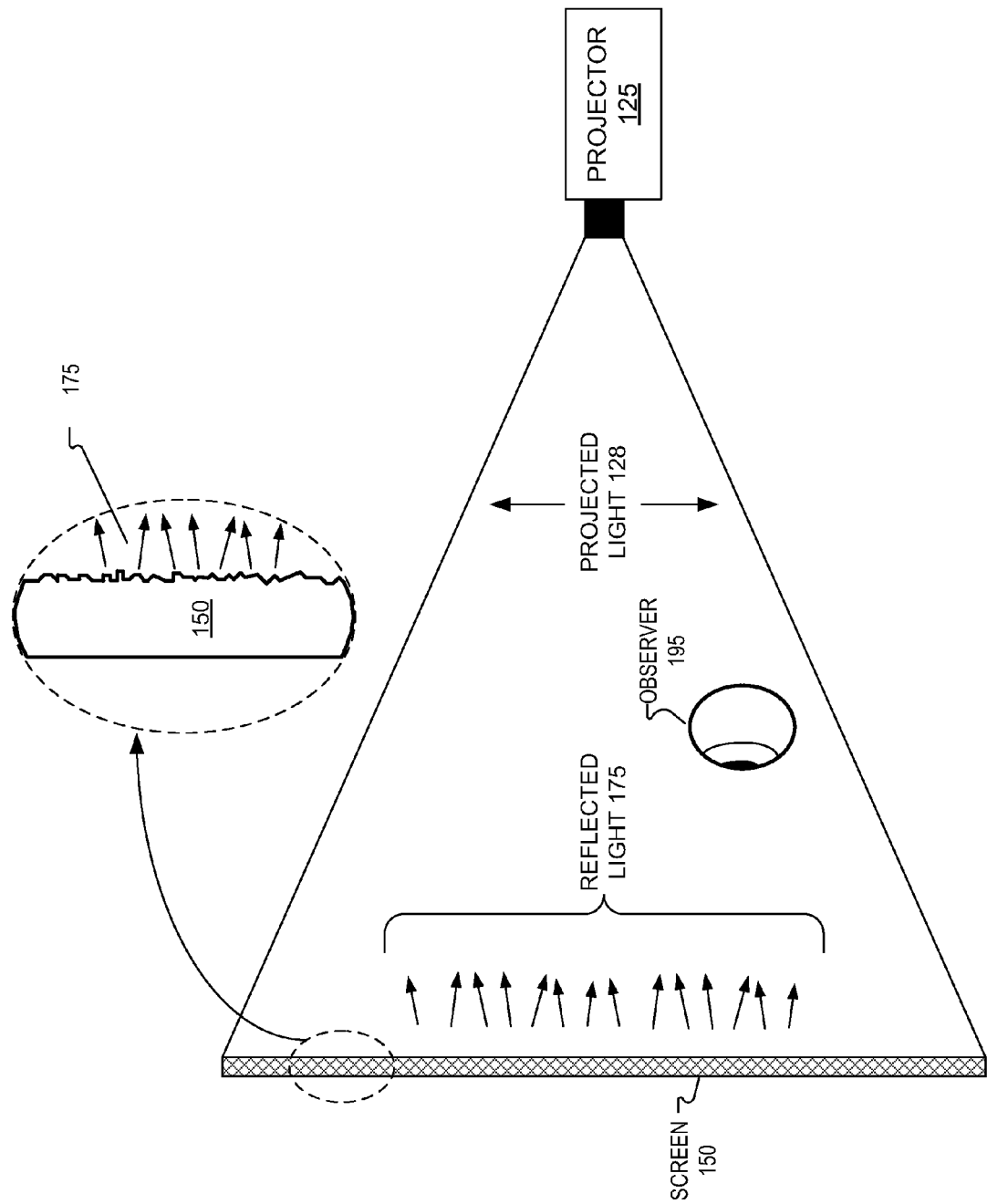
FIG. 1 illustrates an image projector projecting an image on a screen for viewing by an observer, in accordance with an embodiment of the disclosure.

FIG. 1 illustrates an image projector 125 projecting an image on a screen 150 for viewing by an observer 195, in accordance with an embodiment of the disclosure. Image projector 125 includes a light source for generating light that becomes projected light 128. The light from the light source may be reflected off of or directed through a display panel to generate an image for projection on screen 150. The display panel may include DMD, MEMS, DLP, LCD, or LCOS technologies. Additionally, if a laser is used as the light source, the laser used may be laser diodes (semiconductor lasers), gas lasers, solid state lasers, and other types of lasers such as fiber lasers. However, for illustration, only a pico projector using an LCOS display panel and laser diodes will be described.

Projected light 128 reflects off of screen 150 as reflected light 175 that can propagate into the eyes of an observer 195. If a laser is used in a projector that projects onto screen 150, it may cause speckle patterns (spots having random light intensity) if no speckle mitigation steps are taken. The coherent nature of laser light can cause undesired laser speckles. A coherent laser beam incident on a non-specular reflecting surface such as a display screen (e.g. screen 150) or a wall, may be scattered with random phase by the surface. The random phase is caused by the random microscopic profile of the surface. When an observer looks at the projected image on the display screen or wall, the scattered light with random phase will interfere to form a speckle pattern in the retina of the observer. A speckle pattern is characterized by some spots appearing blacked out in a supposedly bright area. The blacked out spots appear to sparkle when there is relative movement between the scattering surface and the observer. Thus, the observer may perceive a projected image corrupted by a speckle pattern. However projector 125 includes a despeckle optical system that reduces speckle patterns in the eye of an observer 195.

Figure 2:
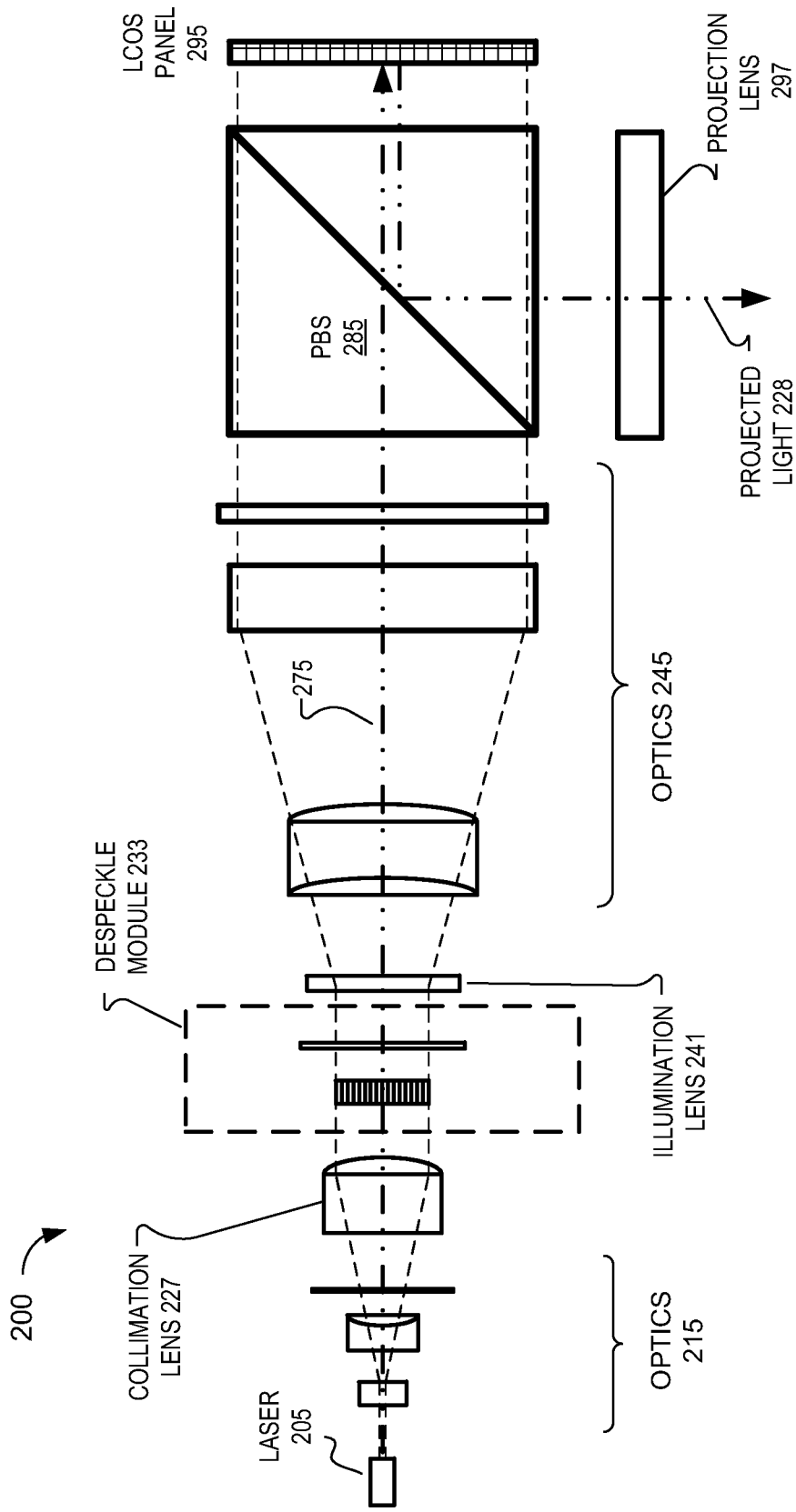
FIG. 2 illustrates an image projection system for an image projector that includes a despeckle module, in accordance with an embodiment of the disclosure.

FIG. 2 illustrates a block diagram of an image projection system 200 for an image projector that includes a despeckle module 233, in accordance with an embodiment of the disclosure. Image projection system 200 may be included in projector 125, for example. Image projection system 200 includes a laser 205, optics 215, a collimation lens 227, a despeckle module 233, an illumination lens 241, optics 245, polarized beam splitter ("PBS") 285, LCOS panel 295, and projection lens 297. Laser 205 generates display light 275 which propagates along a light path toward LCOS panel 295. In the light path, display light 275 encounters optics 215, collimation lens 227, despeckle module 233, illumination lens 241, optics 245, polarized beam splitter ("PBS") 285, and LCOS panel 295, in that order. Optics 215 broaden display light 275 and collimation lens 227 collimates the display light. Despeckle module 233 changes the phase of light (in time) which reduces speckle patterns seen by observers on screen 150. Despeckle module 233 will be further discusses in connection with FIG. 3.

After propagating through despeckle module 233, display light 275 propagates through illumination lens 241 and then optics 245. Illumination lens 241 and optics 245 further conditions display light 275 (broadening display light 275 in the illustrated embodiment) for encountering LCOS panel 295. After propagating through illumination lens 241 and optics 245, display light 275 encounters PBS 285. A portion of display light 275 passes through PBS 285, while the remaining portion is blocked or reflected (not illustrated). The portion of display light 275 that passes through PBS 285 is polarization-modulated by LCOS panel 295 to include an image in display light 275. The polarization-modulated light is reflected by LCOS panel 295 and reflected by PBS 285 through projection lens 297 as projected light 228 that includes the image generated by LCOS panel 295.

Figure 3:
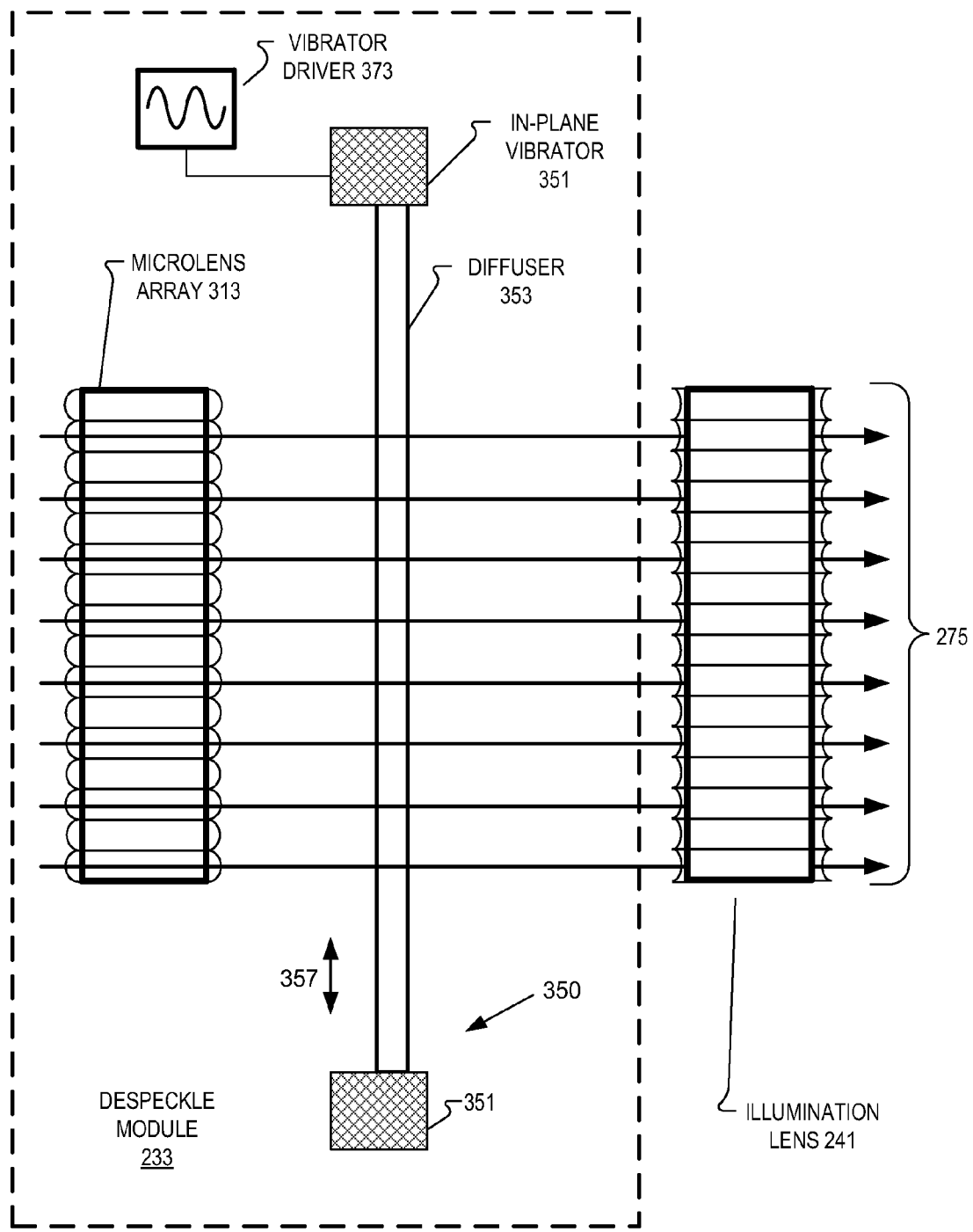
FIG. 3 illustrates a despeckle module that includes a microlens array and a diffuser coupled to an in-plane vibrator, in accordance with an embodiment of the disclosure.

FIG. 3 illustrates one example of despeckle module 233 that includes a microlens array 313, a diffuser 353, an in-plane vibrator 351, and a vibrator driver 373, in accordance with an embodiment of the disclosure. Diffuser 353 is positioned to receive display light 275 through microlens array 313. Microlenses in microlens array 313 may have positive optical power for converging display light 275. Diffuser 353 is coupled to in-plane vibrator 351. In-plane vibrator 351 is coupled to vibrate diffuser 353 along vibration plane 357. Diffuser 353 may be a transmissive diffusive screen that has a scattering angle of five degrees. Diffusers with other characteristics are contemplated for use as diffuser 353. Vibrator driver 373 is coupled to drive in-plane vibrator 351. Vibrator driver 373 may include a microcontroller or other programmable logic configured to generate an electrical signal of different frequencies and/or amplitudes. Vibrator driver 373 may drive in-plane vibrator 351 at different vibration amplitudes and/or frequencies for averaging the intensity of speckle in display light 275. In-plane vibrator 351 may include a comb-drive actuator MEMS (micro-electro-mechanical system) that changes in response to an electrical signal from vibrator driver 373.

Optical measurement performed by Applicants suggested that irradiance values at points in projected images became less extreme and more closely tracked the mean irradiance values when diffuser 353 was vibrated in image projection system 200. In operation, vibrating diffuser 353 with in-plane vibrator 351 changes the phase of display light 275 so the any speckle pattern forming on screen 150 will change randomly and quickly in any given frame. This effectively washes out perceived speckle pattern in a projected image.

Vibrating diffuser 353 independent of microlens array 313 has the potential advantage of being able to vibrate diffuser 353 at frequencies and amplitudes (amount of in-plane movement) independent of consideration for the optical properties of microlens array 313. Vibrating microlens array 313 (instead of diffuser 353) to achieve a despeckling effect may constrain the vibration amplitude or frequency to the physical characteristics and optical properties of microlenses in microlens array 313 in order to still properly focusing display light 275. In contrast, a homogenous diffuser 353 is able to move/vibrate at a potentially greater amplitude (and therefore distance) than microlens array 313, as long as the diffuser is sufficiently large enough to provide its diffusing properties at the extremes of its vibration path.

As display light 275 exits diffuser 353, it may scatter at an angle proportional to the scattering properties (e.g. five degrees) of diffuser 353. Illumination lens 241 receives display light 275 exiting diffuser 353 and further conditions display light 275 for encountering LCOS panel 295. In FIG. 3, illumination lens 241 includes multiple microlenses that have negative optical power. As seen in FIG. 2, illumination lens 242 acts to diverge display light 275.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An image projector comprising:
   at least one light source for generating display light;
   a despeckle module including:
      a diffuser;
      a first microlens array disposed between the at least one light source and the diffuser, wherein the diffuser is positioned next to the first microlens array to receive the display light from the at least one light source through the first microlens array;
      an in-plane vibrator coupled to vibrate the diffuser along a vibration plane; and
      a vibrator driver coupled to drive the in-plane vibrator, wherein the vibrator driver is configured to drive the in-plane vibrator at different vibration amplitudes for averaging the intensity of speckle in the display light;
   a collimation lens positioned between the at least one light source and the first microlens array;
   a display panel positioned to receive the display light from the despeckle module, wherein the display panel is configured to generate a projectable image using the display light; and
   a second microlens array positioned between the display panel and the diffuser, wherein the second microlens array is positioned next to the diffuser, wherein illumination microlenses in the second microlens array have negative optical power, and wherein the display light encounters the second microlens array after the diffuser.

2. The image projector of claim 1, wherein the display panel includes a Liquid Crystal On Silicon ("LCOS") panel and the image projector further comprises:
   a polarized beam splitter ("PBS") positioned between the despeckle module and the LCOS panel.

3. The image projector of claim 1, wherein the at least one light source is one of a laser diode, a gas laser, and a solid state laser.

4. The image projector of claim 1, wherein the diffuser has a scattering angle between 1° and 10°.

5. A despeckle optical system for an image projector, the despeckle optical system comprising:
   a diffuser;
   an in-plane vibrator coupled to vibrate the diffuser along a vibration plane;
   a first microlens array positioned adjacent to the diffuser;
   a vibrator driver coupled to drive the in-plane vibrator, wherein the vibrator driver is configured to drive the in-plane vibrator at different vibration amplitudes for averaging the intensity of speckle in display light that propagates through the diffuser via the first microlens array;

a second microlens array positioned next to the diffuser, wherein the diffuser is positioned between the second microlens array and the first microlens array, and wherein illumination microlenses in the second microlens array have negative optical power; and a collimation lens, wherein the first microlens array is positioned between the diffuser and the collimation lens.

6. The despeckle optical system of claim 5 further comprising:

a polarized beam splitter ("PBS"); and an illumination microlens array, wherein the illumination microlens array is positioned between the PBS and the diffuser.

7. The despeckle optical system of claim 5, wherein the diffuser has a scattering angle between 1° and 10°.

* * * * *